June 3, 1958     K. W. JAY     2,837,148
FUEL METERING VALVE
Filed July 25, 1956     2 Sheets-Sheet 1

*INVENTOR*
K. W. JAY
BY: Maybee & Legris
*ATTORNEYS*

June 3, 1958     K. W. JAY     2,837,148
FUEL METERING VALVE

Filed July 25, 1956     2 Sheets-Sheet 2

INVENTOR
K. W. JAY
BY: Maybee & Legris
ATTORNEYS

United States Patent Office 2,837,148
Patented June 3, 1958

2,837,148

FUEL METERING VALVE

Kenneth William Jay, Beverly Hills, Ontario, Canada, assignor to Orenda Engines Limited, Malton, Ontario, Canada, a corporation Application July 25, 1956, Serial No. 600,116

5 Claims. (Cl. 158—36)

This invention relates to a combined scavenge, priming and metering valve for controlling the supply of fuel under pressure to conduits leading to injection nozzles of a gas turbine engine.

The object of the invention is to mitigate the possibility of fuel being passed into the combustion chamber of the engine when the supply of fuel under pressure is discontinued, and to prime the conduits when the supply of fuel is established and then to supply a metered quantity of fuel to the conduits for injection into the combustion chamber by the nozzles.

To attain this object, the invention provides a valve which, when its members are in one position, provides an unrestricted connection between the conduits leading to the fuel injectors and a scavenge or drainage line, the members of the valve, when in another position, isolating the conduits from the drainage line and connecting them directly to a supply of fuel under pressure for the conduits to be rapidly primed with fuel, the members of the valve when in a third position providing orifices through which fuel is metered from the supply to the conduits.

The foregoing and still further objects and advantages of the invention will become apparent from a study of the following specification, taken in conjunction with the accompanying drawings, in which like reference characters indicate correspondng parts throughout the several views, and in which.

Figure 1:
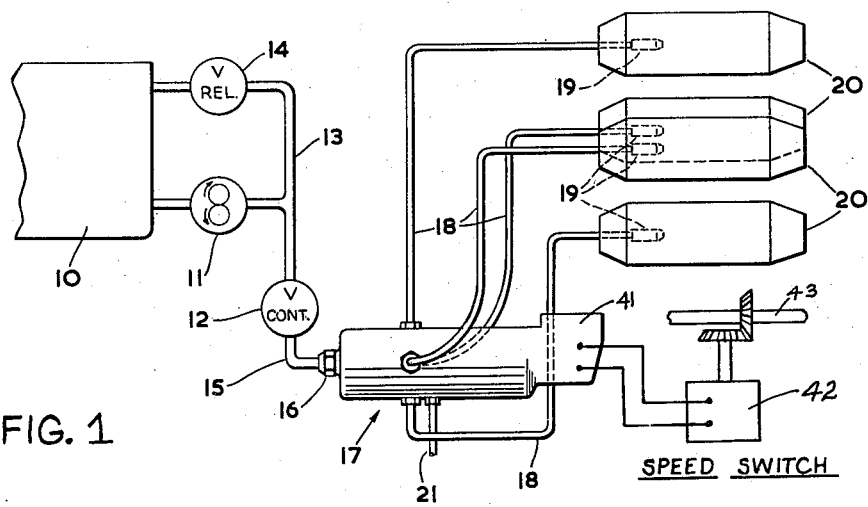
Figure 1 is a diagram indicating the position of the valve of the invention in a fuel supply system for a gas turbine engine.

Referring to Figure 1, a fuel reservoir is indicated at 10, a fuel pump at 11 and a main fuel control valve at 12. A by-pass 13 and pressure relief valve 14 are provided, as is common practice, to allow the pump to be operated when the control valve 12 is closed, the control valve 12 being connected by a conduit 15 and connector 16 to the valve of the invention, the valve being indicated generally at 17. A plurality of conduits 18 extend from the valve 17 to fuel injection nozzles 19 positioned within the combustion chambers 20 of the gas turbine engine, and a scavenge or drainage line 21 is provided through which the conduits 18 can be drained when the engine is closed down.

Referring now to Figures 2 to 5, the valve 17 has a body 25 having coaxial bores 26 and 27, the bore 27 being of slightly less diameter than the bore 26 and providing a step 28 against which a valve member 29 is biased by a spring 30. The step limits the extent to which the valve member 29 can be displaced towards a fuel inlet provided by a threaded bore 25a in which the connector 16 is received.

The valve member 29 has an axial bore 31 with which four radially-extending ports 32 communicate, the axes of the ports lying in a common plane transverse to the axis of the bore; and spaced axially from the ports 32 is a further radially-extending port 33. When the valve member 29 is abutting the step 28, the ports 32 are aligned with ports 34 in the valve body and the port 33 is aligned with a port 35 in the valve body. The ports 34 are threaded to receive a connector for each of the conduits 18, and the port 35 is threaded to receive a connector for the drain pipe 21, a drainage channel 35a being provided connecting the port 35 to the bore 26.

Extending radially of the valve member at its end adjacent the bore 27 are four metering orifices 36, which are conveniently provided by slots milled in the outer periphery of the valve member, the orifices communicating the bore 27 with the ports 34 when the valve member is moved away from the step 28 to the necessary extent.

Within the bore 31 of the valve member 29 is a plunger 38 having lands 39, 40. The plunger is adjustable axially of the bore by any convenient mechanism 41, under the control of a speed switch 42 driven from the turbine rotor, indicated at 43, the mechanism operating in dependence on the engine rotor speed for the mcehanism to move the plunger from the position shown in Figure 2 to the position shown in Figure 4 as the engine rotor is accelerated from rest to starting speed, the mechanism maintaining the plunger in the position shown in Figure 4 until the engine rotor speed drops below a predetermined minimum and the engine is being shut down, at which time the mechanism returns the plunger to the position shown in Figure 2. The pump 11 is driven from the engine rotor, as is common practice, so that its output increases as the speed of the rotor increases and vice versa.

Figure 2:
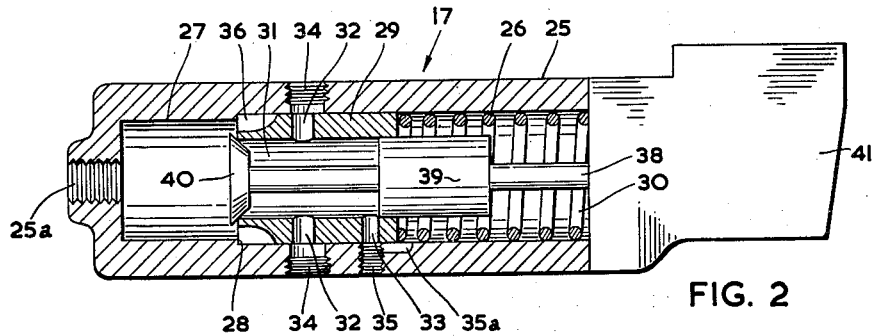
Figure 2 is a sectional elevation through the valve showing members of the valve in the position they occupy when conduits for supplying fuel under pressure to injection nozzles of the engine are connected to a scavenge or drainage line.

Considering now the functioning of the valve:

When the members of the valve are in the position shown in Figure 2, the ports 32, 34 and 33, 35 are in alignment, and any fuel which is within the conduits 18 has an unrestricted passage through the ports 32, 34, between the lands 39, 40 and through the ports 33, 35 to the scavenge or drainage line 21, thus mitigating the possibility of fuel or fuel vapour passing into the hot combustion chambers, where its presence would be objectionable. It will be noted that both ends of the bore 31 are closed by the lands 39, 40, and that the land 40, which is frusto-conical in form, prevents fuel from draining from the pipe line 15 and the bore 27 to the line 21.

Figure 3:
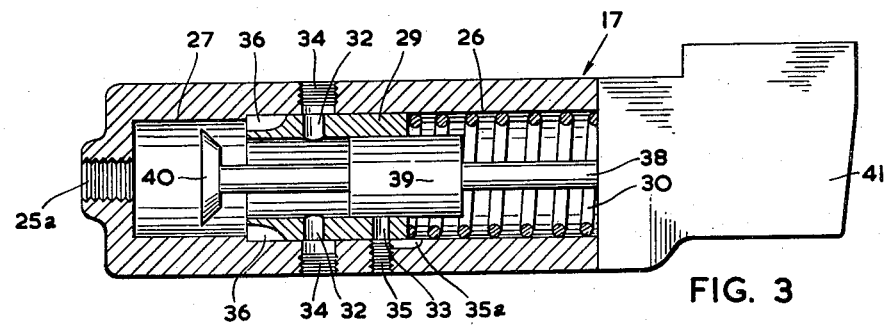
Figure 3 is a sectional elevation corresponding to Figure 2 showing members of the valve in the position they occupy when a supply of fuel under pressure is connected to the conduits for priming them prior to operation of the engine.

As the engine rotor is accelerated from rest to starting speed the pump 11 starts to deliver, and the mechanism 41 moves the plunger 38 to the position shown in Figure 3, in which the land 40 no longer closes the end of the bore 31 and the land 39 masks the port 33 to isolate the drainage line 21. Fuel entering the bore 27 through the bore 25a thus has an unrestricted passage through the ports 32, 34 to the conduits 18 for priming them preparatory to operating the engine.

Figure 4:
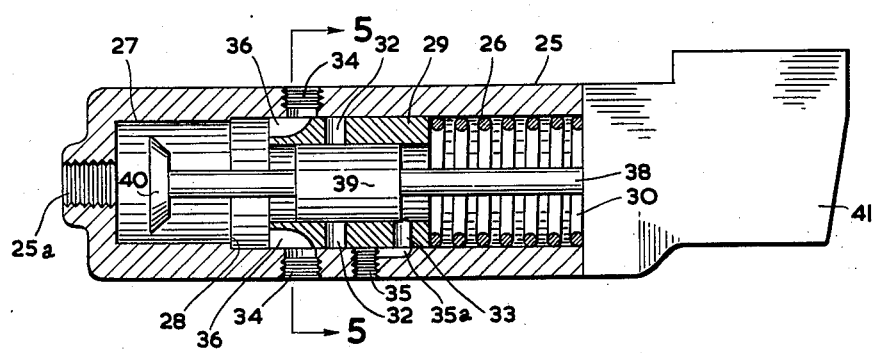
Figure 4 is a view corresponding to Figures 2 or 3 showing members of the valve in the position they occupy when metering a supply of fuel under pressure to conduits.
Figure 5:
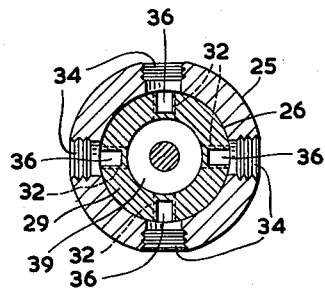
Figure 5 is a section on the line 5—5 of Figure 4.

As the engine rotor approaches the starting speed the mechanism 41 moves the plunger from the position shown in Figure 3 to the position shown in Figure 4, during which movement the land 39 moves over the ports 32 to mask them and discontinue the supply of fuel for priming the conduits. When in this position (i. e. with the valve member 29 in the position shown in Figure 3 and the plunger 38 in the position shown in Figure 4) the bore 27 has no outlet, and the pressure within the bore builds up on the radial end face of the valve member 29 to move it axially in opposition to the bias of the spring 30. Continued axial movement of the valve member 29 brings the metering orifices 36 into register with the ports 34 in the valve body, the orifices thus serving to meter fuel supplied to the burners during operation of the engine, this position being shown in Figure 4.

When the engine is to be shut down, the supply of fuel to the burners is discontinued at the valve 12, and, due to the drop in pressure within the bore 27, the valve member 29 is moved towards the position shown in Figure 3 by the spring 30. As the engine rotor speed drops below the predetermined minimum, the mechanism 41 operates to move the plunger 38 back to the position shown in Figure 2 to reconnect the conduits 18 to the drain line 21 and close off the end of the bore 31 adjacent the fuel inlet.

It will be understood that the forms of the invention herewith shown and described are to be taken as preferred examples of the same, and various changes in the shape, size and arrangement of the parts may be resorted to without departing from the spirit of the invention or the scope of the subjoined claims.

What I claim as my invention is:

1. A combined scavenge, priming and metering valve for a fuel system of a gas turbine engine, including a valve body having a bore, a connection providing an inlet by which fuel under pressure can be supplied to one end of the bore, a valve member slidable within the bore and having an axial bore, means in the bore of the valve body limiting the extent of movement of the valve member towards the fuel inlet, means biasing the valve member into engagement with the limiting means, the valve member having at least two radial ports spaced axially of the valve member which, when the valve member is engaging the limiting means, connect ports of the valve body with the bore of the valve member, a plunger extending through the bore of the valve member, means for moving the plunger axially of the bores between two extreme positions, a first land of the plunger slidable within the bore of the valve member, and a second land of the plunger closing the bore of the valve member at its end adjacent the fuel inlet of the valve body when the valve member is engaging the limiting means and the plunger is in one of its extreme positions, the lands providing a free communication between each of the ports in the valve member when the plunger is in its said one extreme position; the first land masking one of the ports in the valve member when the plunger is in an intermediate position and the valve member is engaging the limiting means, the second land permitting free communication between the other of the ports in the valve member and the said fuel inlet; the first land masking each of the ports to isolate the ports when the plunger is in its other extreme position and the valve member is engaging the limiting means; the valve member providing at least one metered orifice which is masked by the bore of the valve body when the valve member is engaging the limiting means and through which fuel can pass to a port of the valve body when the valve member is displaced from the limiting means.

2. A combined scavenge, priming and metering valve for a fuel system of a gas turbine engine, including a valve body having a bore, a connection providing an inlet by which fuel under pressure can be supplied to one end of the bore, a valve member slidable within the bore and having an axial bore, a step in the bore of the valve body limiting the extent of movement of the valve member towards the fuel inlet, means biasing the valve member into engagement with the step, the valve member having at least two radial ports spaced axially of the valve member which, when the valve member is engaging the step, connect ports of the valve body with the bore of the valve member, a plunger extending through the bore of the valve member, means for moving the plunger axially of the bores between two extreme positions, a first land of the plunger slidable within the bore of the valve member, and a second land of the plunger closing the bore of the valve member at its end adjacent the fuel inlet of the valve body when the valve member is engaging the limiting means and the plunger is in one of its extreme positions, the lands providing a free communication between each of the ports in the valve member when the plunger is in its said one extreme position; the first land masking the port in the valve member which is remote from the fuel inlet when the plunger is in an intermediate position and the valve member is engaging the step, the second land permitting free communication between the other of the ports in the valve member and the said fuel inlet; the first land masking each of the ports to isolate the ports when the plunger is in its other extreme position and the valve member is engaging the step; the valve member providing at least one metered orifice which is masked by the bore of the valve body when the valve member is engaging the step and through which fuel can pass to a port of the valve body which is adjacent the fuel inlet when the valve member is displaced from the step.

3. A combined scavenge, priming and metering valve for a fuel system of a gas turbine engine, including a valve body having a bore, a connection providing an inlet by which fuel under pressure can be supplied to one end of the bore, a valve member slidable within the bore and having an axial bore, a step in the bore of the valve body limiting the extent of movement of the valve member towards the fuel inlet, means biasing the valve member into engagement with the step, the valve member having at least two radial ports spaced axially of the valve member which, when the valve member is engaging the step, connect ports of the valve body with the bore of the valve member, a plunger extending through the bore of the valve member, means for moving the plunger axially of the bores between two extreme positions, a first land of the plunger slidable within the bore of the valve member, and a second land of the plunger closing the bore of the valve member at its end adjacent the fuel inlet of the valve body when the valve member is engaging the limiting means and the plunger is in one of its extreme positions, the lands providing a free communication between each of the ports in the valve member when the plunger is in its said one extreme position; the first land masking the port in the valve member which is remote from the fuel inlet when the plunger is in an intermediate position and the valve member is engaging the step, the second land providing free communication between the other of the ports in the valve member and the said fuel inlet; the first land masking each of the ports to isolate the ports when the plunger is in its other extreme position and the valve member is engaging the step; the valve member providing at least one metered orifice which is masked by the bore of the valve body when the valve member is engaging the step and through which fuel can pass to a port of the valve body which is adjacent the fuel inlet when the valve member is displaced from the step, the metering orifice being provided by a slot extending between the outer axial surface of the valve member and the radial face thereof adjacent the fuel inlet.

4. A combined scavenge, priming and metering valve for a fuel system of a gas turbine engine, including a valve body having a bore, a connection providing an inlet by which fuel under pressure can be supplied to one end of the bore, a valve member slidable within the bore and having an axial bore, a step within the bore of the valve body limiting the extent of movement of the valve member towards the fuel inlet, a spring biasing the valve member into engagement with the step, the valve member having a series of radial ports which, when the valve member is engaging the step connect a series of ports of the valve body with the bore of the valve member, the valve member having at least one other radial port spaced axially of the valve member from the said series of ports at their side remote from the fuel inlet and which, when the valve member is engaging the step, connects a further port of the valve body with the bore of the valve member, a plunger extending through the bore of the valve member, means for moving the plunger axially of the bores between two extreme positions, a first land of the plunger slidable within the bore of the valve member, and a second land of the plunger closing the bore of the valve member at its end adjacent the fuel inlet of the valve body when the valve member is engaging the limiting means and the plunger is in one of its extreme positions, the lands providing a free communication between the said series of ports and the axially spaced ports in the valve member and valve body; the first land masking the said axially spaced port in the valve member when the plunger is in an intermediate position and the valve member is engaging the step, the said ports being in communication with the said fuel inlet; the lands masking the said series of ports in the valve member and isolating them from the axially spaced port in the valve member when the plunger is in its other extreme position and the valve member is engaging the step; the valve member having at least one metered orifice which is masked by the bore of the valve body when the valve member is engaging the step and through which fuel can pass to the said series of ports of the valve body when the valve member is displaced from the step.

5. A combined priming, metering and dump valve for a fuel system of a gas turbine engine, including a valve body having a bore, a connection providing an inlet by which fuel under pressure can be supplied to one end of the bore, a valve member slidable within the bore and having a coaxial bore, a step within the bore of the valve body limiting the extent of movement of the valve member towards the fuel inlet, a compression spring within the bore of the valve body biasing the valve member into engagement with step, the valve member having a series of radial ports arranged with their axes in a common plane, which ports, when the valve member is engaging the step, connect a series of ports in the valve body with the bore of the valve member, the valve member having at least one other radial port spaced axially of the valve member from its said series of ports at their side remote from the fuel inlet and which, when the valve member is engaging the step, connects a further port of the valve body with the bore of the valve member, a plunger extending through the bore of the valve member, a cylindrical land of the plunger slidable within the bore of the valve member, a frusto-conical land of the plunger for coaction with the edge of the bore of the valve member at its end adjacent the fuel inlet, means for moving the plunger axially of the bores between two extreme positions, the lands closing both ends of the bore of the valve member when the plunger is in one of its extreme positions and providing a free communication between the said series of ports and the axially spaced ports of the valve member and valve body; the cylindrical land masking the axially spaced port of the valve member when the plunger is in an intermediate position and the valve member is engaging the step, the frusto-conical land permitting free communication between the said series of ports of the valve member and the valve body and the said fuel inlet; the cylindrical land masking the said series of ports of the valve member and isolating them from the axially spaced port of the valve member when the plunger is in its other extreme position and the valve member is abutting the step; and a plurality of slots extending radially and axially of the valve member at its end adjacent the fuel inlet, the slots providing metering orifices which are masked by the bore of the valve body when the valve member is abutting the step and through which a metered quantity of fuel can pass to the said series of ports of the valve body when the valve member is displaced from the step.

No references cited.